United States Patent
Kirvan et al.

(10) Patent No.: US 8,005,924 B2
(45) Date of Patent: Aug. 23, 2011

(54) UNIFIED SUPPORT FOR WEB BASED ENTERPRISE MANAGEMENT ("WBEM") SOLUTIONS

(75) Inventors: Scott W. Kirvan, Austin, TX (US); Yanling Qi, Austin, TX (US); Joseph G. Moore, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 168 days.

(21) Appl. No.: 12/432,364

(22) Filed: Apr. 29, 2009

(65) Prior Publication Data

US 2010/0281101 A1    Nov. 4, 2010

(51) Int. Cl.
G06F 15/16    (2006.01)
G06F 15/173    (2006.01)
(52) U.S. Cl. ............... 709/217; 709/225; 709/229
(58) Field of Classification Search .......... 709/217–219, 709/227
See application file for complete search history.

(56) References Cited

U.S. PATENT DOCUMENTS

| | | | | |
|---|---|---|---|---|
| 7,406,682 | B2 * | 7/2008 | Todd et al. | 717/137 |
| 7,496,574 | B2 * | 2/2009 | Walker | 1/1 |
| 7,529,898 | B2 * | 5/2009 | Nguyen et al. | 711/162 |
| 7,624,155 | B1 * | 11/2009 | Nordin et al. | 709/208 |
| 7,676,562 | B2 * | 3/2010 | Reistad et al. | 709/223 |
| 7,843,906 | B1 * | 11/2010 | Chidambaram et al. | 370/386 |
| 7,843,907 | B1 * | 11/2010 | Abou-Emara et al. | 370/386 |
| 7,844,585 | B2 * | 11/2010 | Walker | 707/704 |

* cited by examiner

Primary Examiner — Hussein A Elchanti
(74) Attorney, Agent, or Firm — Duft Bornsen & Fishman LLP

(57) ABSTRACT

Methods and systems for support a unified Web Based Enterprise Management ("WBEM") solution is provided. A first processing element for generating first HTTP content data is provided such that a response to a non-Common Information Model ("CIM") request is based on the first HTTP content data. A second processing element for generating second HTTP content data is also provided such that another response to a CIM request is based on the second HTTP content data. At least one of the first processing element and the second processing element is accessible directly only from within the system to unify access to the two elements.

20 Claims, 3 Drawing Sheets

Single process, single address space, and/or single object file

UNIFIED SUPPORT FOR WEB BASED ENTERPRISE MANAGEMENT ("WBEM") SOLUTIONS

BACKGROUND

1. Field of the Invention

The invention relates generally to supporting a Web Based Enterprise Management ("WBEM") environment and more specifically relates to providing unified support for a WBEM solution.

2. Discussion of Related Art

Web Based Enterprise Management ("WBEM") comprises standard-based technologies for a client to communicate system/device management messages with a server. More specifically, a specially designed client application opens a port of the server and uses the Hypertext Transfer Protocol ("HTTP") to exchange the management messages with the server. However, typically the specially designed client application needs to be installed and maintained at a client computer. For example, when a device of the server is updated with added capabilities, not only does the server need to be updated, but each client computer having the specially designed client application also needs to be updated to support the added capabilities.

One possible solution is to allow the client computer to launch a general purpose web browser to download an applet (or a small program, or part of a small program) from the server, and then execute the applet within the general purpose web browser. However, a security concept known as same origin policy, which specifies that an applet is not allowed to communicate with other than the applet's origin site and port, usually prevents the applet from being operational. For example, the origin port (e.g., port 80) from which the applet is downloaded is usually different from the port (e.g., WBEM port 5988 for a WBEM server) that the applet needs to communicate with to exchange management messages.

One possible method to circumvent the "same origin policy" is to use a proxy server. The applet would be downloaded from the proxy server (e.g., from port 80 of the proxy server), and the applet would communicate with the proxy server (e.g., still using port 80) such that, based on certain rules, the proxy server finally forwards management messages to the WBEM server (that may reside at WBEM port 5988 of the proxy server and/or on a different server). However, there would at least be two components (i.e., the proxy server and the WBEM server) that occupy server memory and resources, and need to be installed, configured, and supported. Importantly, having two components also opens up more possibilities (e.g., both ports 80 and 5988 are both open) for external network attacks with critical security ramifications.

Thus it is an ongoing challenge to provide unified support for a WBEM solution.

SUMMARY

The present invention solves the above and other problems, thereby advancing the state of the useful arts, by providing systems and computer readable medium/program to support a unified Web Based Enterprise Management ("WBEM") solution. A first processing element for generating first HTTP content data is provided in a server such that a response to a non-Common Information Model ("CIM") request is based on the first HTTP content data. A second processing element for generating second HTTP content data is also provided such that another response to a CIM request is based on the second HTTP content data. At least one of the first processing element and the second processing element is accessible directly only from within the system. Beneficially, because there are fewer components that can be accessed directly by the external client from outside the system, security is improved with fewer opportunities for external network attacks.

In one aspect hereof, a system is provided for supporting Web Based Enterprise Management ("WBEM"). The system comprises a first processing element for generating first HTTP content data, in that a response to a non-Common Information Model ("CIM") request originally received in a first HTTP request is based on the first HTTP content data, and in that the first HTTP request is sent by a client in communication with the system. The system also comprises a second processing element for generating second HTTP content data, in that another response to a CIM request originally received in a second HTTP request is based on the second HTTP content data, and in that the second HTTP request is also sent by the client. Additionally, at least one of the first processing element and the second processing element is accessible directly only from within the system.

Another aspect hereof provides a storage system for supporting Web Based Enterprise Management ("WBEM"). The storage system comprises a first processing element for generating first HTTP content data, in that a response to a non-Common Information Model ("CIM") request originally received in a first HTTP request is based on the first HTTP content data, and in that the first HTTP request is sent by a client in communication with the system. The storage system also comprises a second processing element for generating second HTTP content data, in that another response to a CIM request originally received in a second HTTP request is based on the second HTTP content data, and in that the second HTTP request is also sent by the client. Moreover, the first processing element and the second processing element share a single address space such that an address to a location in memory is the same for both the first processing element and the second processing element. Furthermore, the client uses a single Internet Protocol ("IP") port number for both the first HTTP request and the second HTTP request.

Yet another aspect hereof provides a computer readable medium having a computer readable program embodied therein for supporting Web Based Enterprise Management ("WBEM") in a system. The computer readable program comprises instructions for a first processing element for generating first HTTP content data in the storage subsystem, in that a response to a non-Common Information Model ("CIM") request originally received in a first HTTP request is based on the first HTTP content data, and in that the first HTTP request is sent by a client in communication with the system. The computer readable program also comprises instructions for a second processing element for generating second HTTP content data in the storage subsystem, in that another response to a CIM request originally received in a second HTTP request is based on the second HTTP content data, and in that the second HTTP request is also sent by the client. Additionally, the instructions for the first processing element and the instructions for the second processing element are included in a single object file.

DETAILED DESCRIPTION OF THE DRAWINGS

Figure 1:
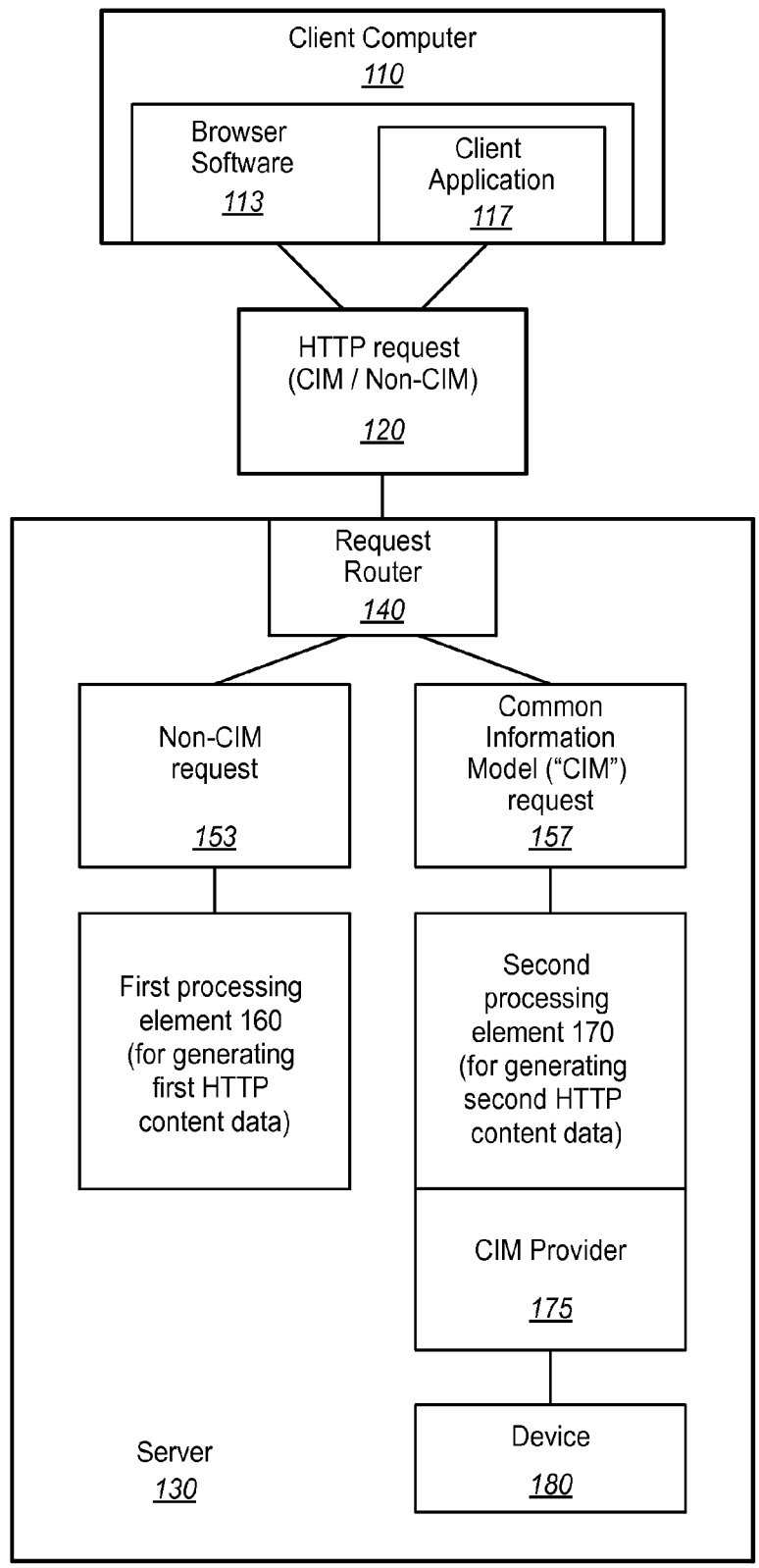
FIG. 1 is a block diagram of an exemplary system for supporting Web Based Enterprise Management ("WBEM") in accordance with features and aspects hereof.

FIG. 1 is a block diagram of an exemplary system for supporting Web Based Enterprise Management ("WBEM") in accordance with features and aspects hereof. A client computer 110 is in communication with a server 130 in that the client computer 110 sends Hypertext Transfer Protocol ("HTTP") requests 120 to be handled by the server 130.

The client computer 110 may comprise any computing device or machine that allows a user to operate browser software 113. The browser software 113 may comprise any web browser that can connect to a web server and retrieve web pages and/or a client application 117. For example, the browser software 113 may comprise Internet Explorer or Mozilla Firefox, among others. The client application 117 may comprise an applet or a software component that is executed in the context of or by the browser software 113. For example, the client application 117 may comprise a Java applet or an Adobe Flash applet, among others. It is noted that the browser software 113 and/or the client computer 110 may further comprise additional plugins or components including an Adobe Flash Player. As will be discussed in greater detail, the client application 117 may comprise a portion of an overall application, with each portion being downloaded from the server 130 as needed.

The server 130 may comprise a server computer or an appliance. For example, the server computer may run an operating system including Microsoft Windows Server or Linux, and may comprise or connect to a device 180. The server computer itself and/or the device 180 may need to be managed. The appliance may comprise an embedded operating environment that may run an embedded operating system including VxWorks or an embedded version of Linux. The appliance may comprise or connect to the device 180. The appliance itself and/or the device 180 may need to be managed.

The server 130 comprises elements for responding to HTTP requests 120 sent from the client computer 110. More specifically, the server 130 comprises a request router 140, a first processing element 160 (for generating first HTTP content data), a second processing element 170 (for generating second HTTP content data), and a CIM provider 175. Each of these elements of the server 130 may comprise circuitry, software, and/or their equivalents.

Operations of the exemplary system may be initiated by a user. For example, the user may open the browser software 113 to access a location in order to manage the device 180 of the server 130. To access the location, the browser software 113 sends a non-Common Information Model ("CIM") HTTP request 120 to the server 130. The non-CIM HTTP request is sent using the HTTP protocol as the transport and may comprise an HTTP GET request. The request router 140 identifies that the HTTP request 120 comprises a non-CIM request 153 and routes the request to the first processing element 160 (for generating the first HTTP content data). For example, if the non-CIM request 153 comprises the HTTP GET request, the data at a path specified in the HTTP GET request is retrieved to generate the appropriate first HTTP content data, which is then sent back to the browser software 113.

The data that has been sent back to the browser software 113 may comprise the client application 117 (or a portion of the client application 117). The browser software 113 proceeds to execute the client application 117 so that the user may then interact with the client application 117 in order to manage the device 180. Subsequently, the user may cause the client application 117 to send a management message to the device 180. Accordingly, the client application 117 may send a CIM HTTP request 120 to the server 130. The CIM HTTP request 120 is sent using the HTTP protocol as the transport and may comprise an HTTP POST (or M-POST) request. The request router 140 identifies that the HTTP request 120 comprises a CIM request 157 and routes the request to the second processing element 170 (for generating the second HTTP content data).

To process the CIM request 157, the second processing element 170 may forward request data in the CIM request 157 to the CIM provider 175. For example, if the CIM request 157 comprises the HTTP POST request, the second processing element 170 extracts the request data from the HTTP POST request before sending/passing the request data to the CIM provider 175. The CIM provider 175 further processes and converts the request data (that may comprise a CIM request rather than a native command accepted/understood by the device 180) and issues one or more native commands to the device 180. The CIM provider 175 may receive and process/convert a response (that may comprise a native response rather than a CIM message) from the device 180, and forward the (converted) response back to the second processing element 170. The second processing element 170 then generates the second HTTP content data based on the response received from the CIM provider 175. The second HTTP content data is subsequently sent back to the client application 117. The client application 117 may then convert and display the second HTTP content data for the user.

As noted above, only a portion of the overall application may have been downloaded and received at the client computer 110. Accordingly, in some instances one or more additional portions of the client application 117 may be downloaded by sending one or more additional non-CIM HTTP requests to the server 130 before the additional portions can be executed at the client computer 110. In other instances, the browser software 113, the client application 117, and/or another element may be able to access the server 130 to request a help file, a manual, or any other web page/data. Such a request would also be sent as a non-CIM HTTP request and would be handled by the first processing element 160.

The first processing element 160 and the second processing element 170 may be arranged such that at least one of the first processing element 160 and the second processing element 170 is accessible directly only from within the server 130. For example, the at least one element may be accessed directly only through a message passed in a procedure call, in an object/method invocation, between threads, and/or between processes within the server 130. Accordingly, the at least one element cannot be accessed directly by the client computer 110 (including its browser software 113 and client application 117) from outside the server 130. The message may be passed using memory stack (e.g., in a procedure call), pipes, sockets, shared memory, or any of a wide variety of inter-process or inter-procedure/method communication techniques within the server 130. The client computer 110 is not able to pass the message directly from outside the server 130, for example, because the client computer 110 (from outside the server 130) cannot access the memory space within the server 130 directly. In other words, direct access to the at least one element is hidden from the client computer 110 that resides outside of the server 130.

In one embodiment, the client computer 110 (including its browser software 113 and client application 117) is able to connect to the server 130 over a network using Internet sockets (i.e., by opening an Internet port on the server 130). The protocol used may be Internet Protocol version ("IPv4") or Internet Protocol version ("IPv6"). However, at least one of the first processing element 160 and the second processing element 170 cannot be accessed directly using Internet sockets. Rather, the at least one element is accessible to the client computer 110 only indirectly. For example, the client computer 110 may use Internet sockets to communicate with an intermediary (e.g., the request router 140), and then indirectly access the at least one element through the intermediary. Accordingly, the request router 140 may be responsible for handling Internet sockets communications in addition to routing/processing the non-CIM request 153, the CIM request 137, and their corresponding response data (e.g., the first and second HTTP content data).

The first processing element 160 and the second processing element 170 may be associated with a single Internet Protocol ("IP") address (i.e., the IP address of the server 130). The first processing element 160 and the second processing element 170 may further be associated with a single IP port number (e.g., the IP port number of the request router 140). Accordingly, all HTTP requests 120 would be sent by opening IP ports using the single IP port number. Direct access (from the request router 140) to one of the first processing element 160 and the second processing element 170 may be without the request router 140 opening an Internet port from within the server 130. Rather, direct access to one of the two elements may be through a message passed in a procedure call, in an object/method invocation, between threads, and/or between processes within the server 130 discussed above. Beneficially, security is improved with fewer opportunities for external network attacks because there are fewer components that can be accessed directly by an external element outside the server 130.

The request router 140, the first processing element 160, and the second processing element 170 may be integrated in a wide variety of configurations. For example, the three elements may each be arranged in a separate thread or process. Alternatively, the request router 140 and the first processing element 160 may be arranged in a single thread or process, with the second processing element 170 being arranged in another thread or process. In another alternative, the request router 140 and the second processing element 170 may be arranged in a single thread or process, with the first processing element 160 being arranged in another thread or process. It is noted that the second processing element 170 and the portion of the request router 140 that handles Internet sockets communications (but not the portion that routes/processes the non-CIM request 153) may together be recognized by those skilled in the art as a CIM Object Manager ("CIMOM"). In yet another alternative, the first processing element 160 and the second processing element 170 may be arranged in a single thread or process, with the request router element 140 being arranged in another thread or process. In another alternative, all three elements may be arranged in a single thread or process.

Figure 2:
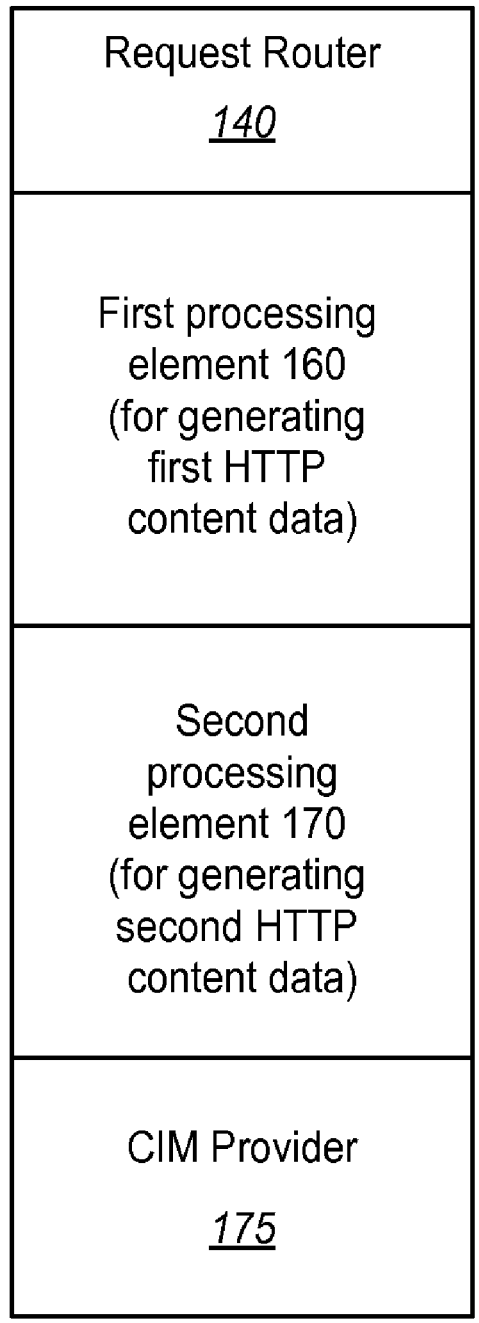
FIG. 2 is a block diagram of an exemplary single process, single address space, and/or single object file for supporting WBEM in accordance with features and aspects hereof.

FIG. 2 is a block diagram of an exemplary single process, single address space, and/or single object file for supporting WBEM in accordance with features and aspects hereof. The first processing element 160, the second processing element 170, the request router 140, and the CIM provider 175 may each comprise computer instructions. Instructions for the first processing element 160, the second processing element 170, and optionally the request router 140 and/or the CIM provider 175 may all be executed in a single process of the operating system of the server 130. Accordingly, at least some of these elements (e.g. the first processing element 160 and the second processing element 170) may share a single process identifier corresponding to the single process. Similarly, at least some of these elements (e.g. the first processing element 160 and the second processing element 170) may share a single address space such that an address to a location in memory is the same for each of these elements (e.g., the same for both the first processing element 160 and the second processing element 170).

While instructions for these elements may be included in separate files, instructions for at least the first processing element 160 and instruction for the second element 170 may be included in a single object file. Having a single object file can simplify maintenance of the server 130. Meanwhile, different processes and/or threads can still be created from the single object file.

Those of ordinary skill in the art will readily recognize numerous additional and equivalent components and modules within a fully functional system. Such additional and equivalent components are omitted herein for simplicity and brevity of this discussion. Thus, the structures of FIGS. 1 and 2 are intended merely as representatives of exemplary embodiments of features and aspects hereof.

Figure 3:
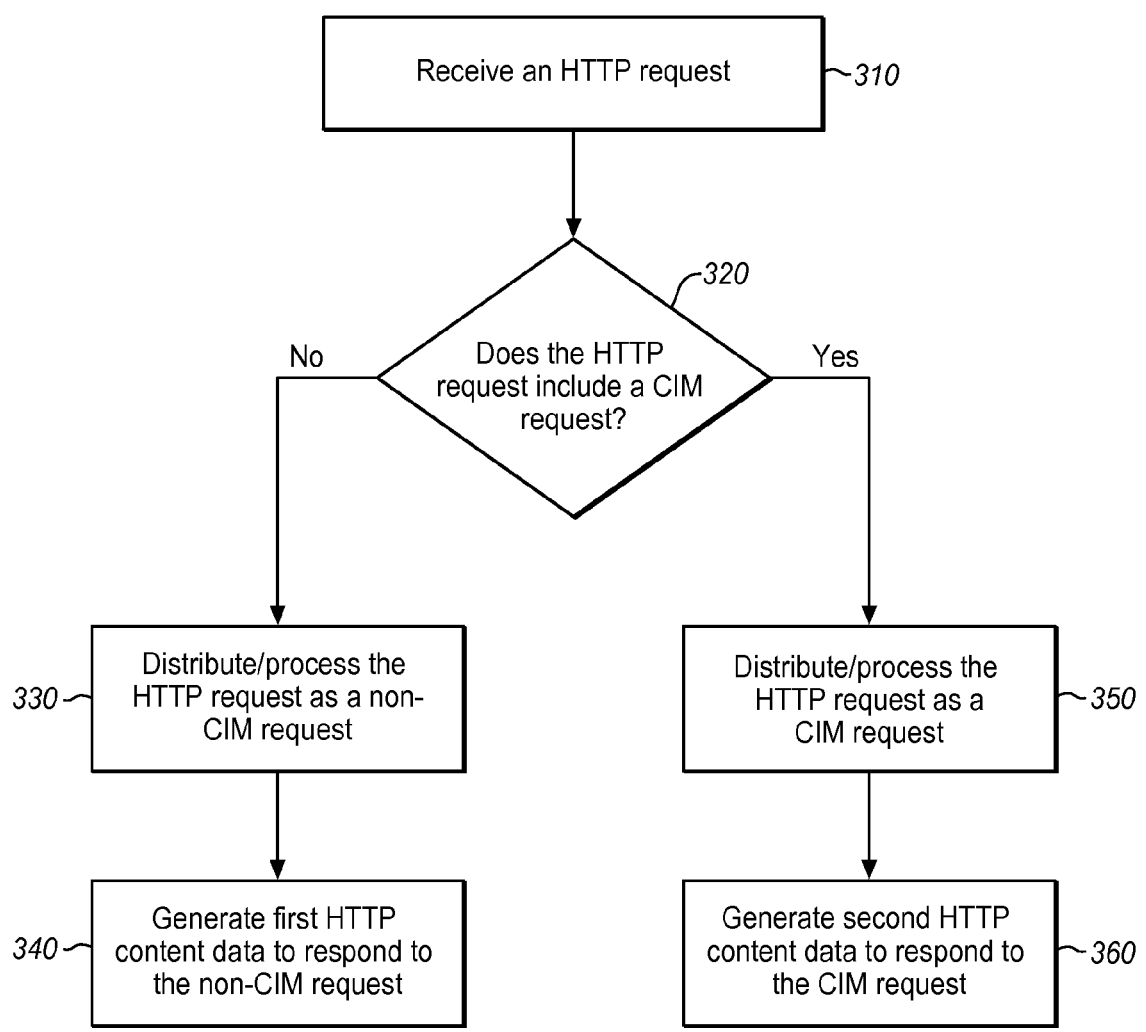
FIG. 3 is a flowchart describing an exemplary method in accordance with features and aspects hereof to support WBEM.

FIG. 3 is a flowchart describing an exemplary method in accordance with features and aspects hereof to support WBEM. The request router 140 may comprise a receiving element for receiving HTTP requests from the client computer 110 in step 310. The request router 140 may also comprise a request distributor for distributing an HTTP request to one of the first processing element 160 and the second processing element 170. For example, the request router 140 may identify whether the HTTP request includes a CIM request in step 320. The request router 140 may identify that the HTTP request includes a CIM request if the request method of the HTTP request is POST. If the request method of the HTTP request is GET, the request router 140 may identify that the HTTP request as including a non-CIM request.

Alternatively or in addition, the request router 140 may identify that the HTTP request includes a CIM request based on a request path. For example, if the first line of the HTTP request is "M-POST/cimom HTTP/1.0," the request router 140 may identify that the HTTP request includes a CIM request at least because of the "/cimom" path. Similarly, if the first line of the request is "GET/client.class HTTP/1.0," the request router 140 may identify that the HTTP request includes a non-CIM request at least because the "/client.class" path specifies a Java class file. Alternatively or in addition, the request router 140 may identify that the HTTP request includes a CIM request based on data supplied with the HTTP request. For example, an HTTP request that includes a CIM request may include a header line "48-CIM-ProtocolVersion: 1.0," among other CIM header lines. As another example, a CIM request may include a message body (i.e., the xmlCIM payload) that begins with a "<CIM . . . " tag in the root element.

If the HTTP request does not include a CIM request, in step 330 the request router 140 distributes/processes the HTTP request as a non-CIM request. For example, the non-CIM request 153 discussed above may be extracted from the HTTP request 120. The non-CIM request 153 may then be sent/passed to the first processing element 160, so that in step 340 the first processing element 160 may generate the first HTTP content data to respond to the non-CIM request 153.

If the HTTP request does include a CIM request, in step 350 the request router 140 distributes/processes the HTTP request as a CIM request. For example, the CIM request 157 discussed above may be extracted from the HTTP request 120. The CIM request 157 may then be sent/passed to the second processing element 170, so that in step 360 the second processing element 170 may generate the second HTTP content data to respond to the CIM request 157.

Those of ordinary skill in the art will readily recognize numerous additional and equivalent steps that may be performed and/or omitted in the methods of FIG. 3. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Web Based Enterprise Management ("WBEM") server comprising:
    a hardware processor configured to implement: a first processing element for generating first HTTP content data, wherein a response to a non-Common Information Model ("CIM") request originally received in a first HTTP request is based on the first HTTP content data, wherein the first HTTP request is sent by a client in communication with the system; and
    a second processing element for generating second HTTP content data, wherein another response to a CIM request originally received in a second HTTP request is based on the second HTTP content data, wherein the second HTTP request is also sent by the client;
    wherein one of the first processing element and the second processing element is accessible directly only by components of the server and is not directly accessible by components external to the server, and
    wherein the other of the first processing element and the second processing element is accessible directly by components within the server and by components external to the server.

2. The server of claim 1, wherein the first processing element and the second processing element are associated with a single Internet Protocol ("IP") address.

3. The server of claim 1, wherein the first processing element and the second processing element are associated with a single IP port number.

4. The server of claim 1, wherein direct access to one of the first processing element and the second processing element is achieved without opening an Internet port from within the server.

5. The server of claim 1, wherein the first processing element and the second processing element share a single process identifier.

6. The server of claim 1, wherein instructions for the first processing element and instructions for the second processing element are included in a single object file.

7. The server of claim 1, further comprising:
    a receiving element for receiving Hypertext Transfer Protocol ("HTTP") requests; and
    a request distributor for distributing an HTTP request to one of the first processing element and the second processing element.

8. The server of claim 7, wherein the request distributor distributes the HTTP request based on a request method.

9. The server of claim 7, wherein the request distributor distributes the HTTP request based on a request path.

10. The server of claim 7, wherein the request distributor distributes the HTTP request based on data supplied with the HTTP request.

11. A storage system for supporting Web Based Enterprise Management ("WBEM"), the storage system comprising:
    a hardware processor configured to implement: a first processing element for generating first HTTP content data, wherein a response to a non-Common Information Model ("CIM") request originally received in a first HTTP request is based on the first HTTP content data, wherein the first HTTP request is sent by a client in communication with the system; and
    a second processing element for generating second HTTP content data, wherein another response to a CIM request originally received in a second HTTP request is based on the second HTTP content data, wherein the second HTTP request is also sent by the client;
    wherein the first processing element and the second processing element share a single address space such that an address to a location in memory is the same for both the first processing element and the second processing element, and such that the client uses a single Internet Protocol ("IP") port number for both the first HTTP request and the second HTTP request,
    wherein one of the first processing element and the second processing element is accessible directly only by components of the storage system and is not directly accessible by components external to the storage system, and
    wherein the other of the first processing element and the second processing element is accessible directly by components within the storage system and by components external to the storage system.

12. The storage system of claim 11, wherein direct access to at least one of the first processing element and the second processing element is hidden from a client outside of the system.

13. The storage system of claim 11, wherein the first processing element and the second processing element are associated with a single Internet Protocol ("IP") address.

14. The storage system of claim 11, wherein direct access to one of the first processing element and the second processing element is achieved without opening an Internet port from within the system.

15. The storage system of claim 11, wherein instructions for the first processing element and instructions for the second processing element are included in a single object file.

16. A non-transitory computer readable medium having a computer readable program embodied therein for supporting Web Based Enterprise Management ("WBEM") in a system, the computer readable program comprising:
    instructions for a first processing element for generating first HTTP content data in the storage subsystem, wherein a response to a non-Common Information Model ("CIM") request originally received in a first HTTP request is based on the first HTTP content data, wherein the first HTTP request is sent by a client in communication with the system; and instructions for a second processing element for generating second HTTP content data in the storage subsystem, wherein another response to a CIM request originally received in a second HTTP request is based on the second HTTP content data, wherein the second HTTP request is also sent by the client;

wherein the instructions for the first processing element and the instructions for the second processing element are included in a single object file, wherein one of the first processing element and the second processing element is accessible directly only by components of the storage system and is not directly accessible by components external to the storage system, and wherein the other of the first processing element and the second processing element is accessible directly by components within the storage system and by components external to the storage system.

17. The computer readable medium of claim 16, wherein at least one of the first processing element and the second processing element is accessible directly only from within the system.

18. The computer readable medium of claim 16, wherein the first processing element and the second processing element are associated with a single Internet Protocol ("IP") address.

19. The computer readable medium of claim 16, wherein direct access to one of the first processing element and the second processing element is achieved without opening an Internet port from within the system.

20. The computer readable medium of claim 16, wherein the first processing element and the second processing element are associated with a single IP port number.

* * * * *